Patented June 6, 1950

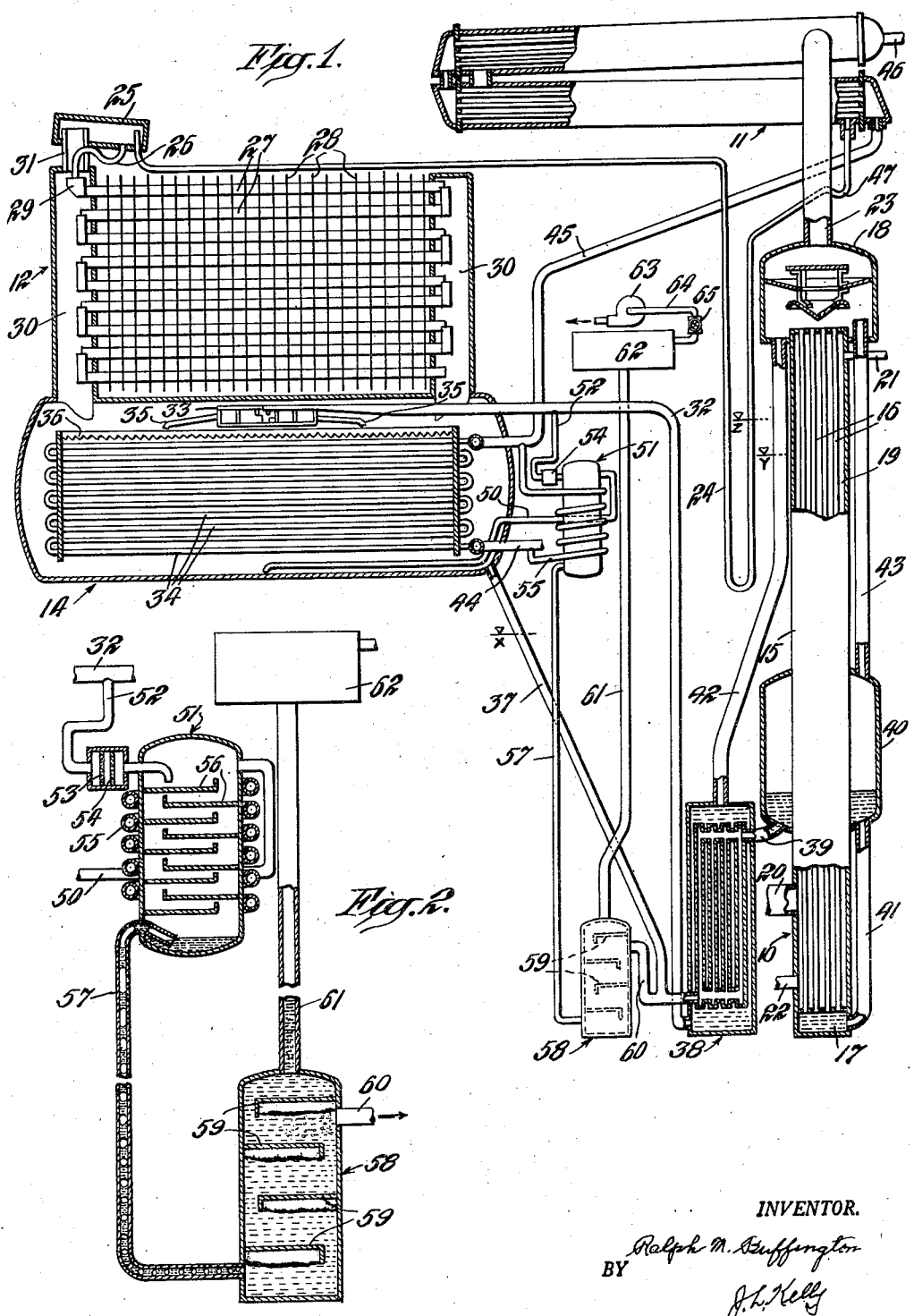

2,510,737

UNITED STATES PATENT OFFICE 2,510,737

REFRIGERATION APPARATUS, INCLUDING MEANS FOR LIMITED REMOVAL OF NON-CONDENSABLE GASES

Ralph M. Buffington, Evansville, Ind., assignor to Servel, Inc., New York, N. Y., a corporation of Delaware Application September 18, 1946, Serial No. 697,756

12 Claims. (Cl. 62—119)

This invention relates to refrigeration, and particularly to heat-operated refrigerating systems.

In refrigeration systems generally, and in low pressure or vacuum type refrigeration systems in particular, non-condensable gases often collect in parts of the system to the detriment of its efficiency. In low-pressure absorption refrigeration systems, for example, non-condensable gases may collect in the condenser, in the evaporator and in the absorber to such an extent that they block off portions of these elements rendering such portions ineffective in the performance of their intended functions. Furthermore, any accumulation of non-condensable gases in these elements effects an increase in the pressure therein, thereby disturbing the normal operation of the system.

Various means have been devised for removing non-condensable gases from different types of refrigerating systems. In the United States patent to A. R. Thomas No. 2,384,860 granted September 18, 1945, for example, an absorption type refrigerating system is disclosed wherein a very effective means is provided for separating non-condensable gases from refrigerant vapor in active parts of the system and for transferring the separated gases to a storage vessel in an inactive part of the system. By "active parts" is meant those parts of the system through which the normal working media circulate and which parts contribute to the production of a refrigerating effect in the normal operation of the system. By "inactive part" is meant that part of the system which is dormant except when non-condensable gases are being removed from the system. The gases are exhausted from the storage vessel to the atmosphere at intervals by a vacuum pump without danger of withdrawing refrigerant vapor or liquid along with the gases and without disturbing the partial vacuum in the system. As a matter of fact, it has been found in practice that this Thomas arrangement for removing non-condensable gases is too effective for this particular type of system in that it affects the normal operation of other parts of the system, particularly the generator.

I have discovered that with heat-operated refrigeration systems, and particularly with absorption systems like that disclosed in the above Thomas patent, that it is advantageous to have dissolved non-condensable gases present in the solution entering the generator. The presence of non-condensable gases in the absorption solution is advantageous in that it eliminates or at least greatly reduces superheating and promotes quiet boiling of the solution in the generator. Super- heating of the solution in the generator not only adversely affects the efficiency of the system, but it causes a nuisance in the form of noise.

It is therefore an object of this invention to provide means for removing non-condensable gases from parts of a refrigerating system in which parts the presence of such gases is detrimental to the efficiency of the system, and for returning such gases or portions thereof to other parts of the system wherein the presence of the gases is beneficial to the efficiency of the system.

Although the invention along with its objects and advantages may be variously applied, I have chosen for purposes of illustration to incorporate my invention in a refrigerating system of the absorption type like that disclosed in the above Thomas patent. In such a system, a purge pump, in the form of a fall tube operated by absorption solution, is provided for removing non-condensable gases from active parts of the system. I provided in this system a liquid-gas contact vessel into the bottom of which the fall tube discharges the non-condensable gases and the absorption solution. In this vessel, the purged non-condensable gases in quantity up to a predetermined amount are trapped and the absorption solution is repeatedly brought into intimate contact with the trapped gases over substantial contact areas, whereby the non-condensable gases, or at least a portion thereof, are dissolved in the absorption solution and any excess of non-condensable gases is conveyed to a storage vessel in an inactive part of the system. The absorption solution with the dissolved non-condensable gases is then conveyed to the bottom of the generator wherein the gases reduce superheating and promote quiet boiling of the solution in the generator. With this arrangement, when the generator is heated, refrigerant vapor is expelled from solution without superheat, and without its ensuing noise.

The invention will be better understood from the following detailed description taken in connection with the accompanying drawing forming a part of the specification and of which:

Fig. 1 is a view which more or less diagrammatically illustrates a refrigeration system embodying the invention; and Fig. 2 is an enlarged fragmentary view of certain parts shown in Fig. 1 to illustrate the invention more clearly.

A system of the type illustrated operates at low pressures and includes a generator or vapor expeller 10, a condenser 11, an evaporator 12 and an absorber 14 which are interconnected in such a manner that flow of fluid between the high and low sides of the system is regulated by liquid columns. The disclosure in the aforementioned Thomas patent may be considered as being incorporated in this application, and, if desired, reference may be made thereto for a detailed description of the refrigeration system.

In Fig. 1 the generator includes an outer shell 15 within which are disclosed a plurality of vertical riser tubes 16 having the lower ends connected to receive liquid from a space 17 and the upper ends extending into and above the bottom of a vessel 18. The space 19 within shell 15 forms a chamber to which steam is supplied through a conduit 20 from a suitable source of supply, so that full length heating of the tubes 16 is effected. A vent 21 is provided at the upper end of shell 15, and a conduit 22 is connected to the bottom part of the shell for draining condensate from the space 19.

The system operates at a partial vacuum and contains a water solution of refrigerant in absorbent liquid, such as, for example, a water solution of lithium chloride or lithium bromide. When steam is supplied through conduit 20 to space 19 at atmospheric pressure, heat is supplied to tubes 16 for expelling water vapor from solution. The absorption liquid is raised by gas or vapor lift action. The water vapor discharged from the upper ends of the tubes or risers 16 separates from the raised absorption liquid in the vessel 18 and flows through a conduit 23 into condenser 11. The condensate formed in condenser 11 flows through a U-tube 24 into a chamber 25 and from the latter through a tube 26 into evaporator 12.

The evaporator 12 may include a plurality of horizontal banks of tubes 27 disposed one above the other and having heat transfer fins 28 secured thereto to provide a relatively extensive heat transfer surface. The liquid flowing to evaporator 12 is divided in any suitable manner for flow through the uppermost bank of tubes 27. For example, the dividing of liquid may be effected by a liquid distributing trough 29 into which the liquid flows from the tube 26. The water flows in successively lower tubes through suitable end connections which are open to permit escape of vapor from the tubes. Any excess liquid refrigerant is discharged from the lowermost tubes 27.

The water supplied to tubes 27 evaporates therein to produce a refrigerating or cooling effect with consequent absorption of heat from the surroundings, as from a stream of air flowing over the exterior surfaces of the tubes 27 and fins 28. The vapor formed in tubes 27 passes out into end headers 30 which are connected at their lower ends to absorber 14. Any vapor formed in chamber 25 passes through a conduit 31 into one of the headers 30 and mixes with vapor formed in the evaporator 12, so that disturbances in the evaporator due to vapor flashing of incoming liquid are avoided.

In absorber 14 refrigerant vapor is absorbed into absorption liquid entering through a conduit 32. The entering absorption liquid flows into a vessel 33 in which liquid is distributed laterally of a plurality of vertically disposed pipe banks 34 arranged alongside of each other. The liquid flows from vessel 33 through conduits 35 into a plurality of liquid holders and distributors 36 which extend lengthwise of and above the uppermost branches of the pipe banks 34. Absorption liquid is siphoned over the walls of the liquid holders 36 onto the uppermost pipe sections. Liquid drips from each horizontal pipe section onto the next lower pipe section, so that all of the pipe sections are wetted with a film of liquid. Absorption liquid flows from absorber 14 through a conduit 37, a first group of passages in liquid heat exchanger 38, conduit 39, vessel 40, and conduit 41 into the bottom space 17 of generator 10. Water vapor is expelled out of solution in generator 10 by heating, and liquid is raised by gas or vapor lift action in riser tube 16, as explained above.

The absorption liquid in vessel 18, from which refrigerant has been expelled from solution, flows through a conduit 42, another group of passages in liquid heat exchanger 38 and conduit 32 into the upper part of absorber 14. This circulation of absorption liquid is effected by raising liquid in the vertical riser tubes 16 by vapor lift action, so that liquid can flow from generator 10 to absorber 14 and return from the latter back to the generator by force of gravity.

The upper part of vessel 40 is connected by conduit 43 to vessel 18, so that the pressure in vessel 40 is equalized with the pressure in the upper part of generator 10 and condenser 11. The vessel 40 is of sufficient volume to hold the liquid differential in the system and is of sufficient cross-sectional area that the liquid level therein does not vary appreciably, so that a substantially constant reaction head is provided for lifting liquid in generator 10.

The heat liberated with absorption of water vapor in absorber 14 is transferred to a cooling medium, such as water, which flows upward through the vertically disposed pipe banks 34. The cooling medium enters the lower end of the pipe banks through a conduit 44 and leaves the upper end of the pipe banks through a conduit 45. The conduit 45 may be connected to condenser 11 so that the same cooling medium may be utilized to effect cooling of both the condenser 11 and absorber 14. From condenser 11 the cooling medium flows through a conduit 46 to waste.

The system operates at low pressures with the generator 10 and condenser 11 operating at one pressure and evaporator 12 and absorber 14 operating at a lower pressure. Flow of fluids between the high and low pressure sides of the apparatus is regulated by liquid columns. Thus, the liquid column formed in U-tube 24 regulates flow of fluid between condenser 11 and evaporator 12, the liquid column in conduit 37 and connecting parts regulates the flow of fluid between the outlet of absorber 14 and the inlet generator 10, and the liquid column formed in conduit 42 and connecting parts controls the flow of fluid between the inlet end of the absorber and the upper part or outlet of the generator. In operation, liquid columns may form in conduits 37, 42 and downleg of tube 24 to the levels $x$, $y$ and $z$, for example.

During operation of the refrigeration system, non-condensable gases may collect in both the high and low pressure sides of the system. The non-condensable gases collecting in the high pressure side of the system, that is, the generator 10 and condenser 11, are carried to the dead or far end of the condenser in the bottom part thereof by the sweeping effect of the refrigerant vapor flowing into the condenser. Since the non-condensable gases are swept to the bottom part of the condenser 11, the U-tube 24 is effectively utilized to transfer such gases from the condenser 11 to the evaporator 12 by providing a trap 47 therein. The trap 47 effectively traps gas in the downleg of tube 24 between slugs of liquid intermittently siphoned from the trap. Hence, the liquid refrigerant flowing through the tube 24 to evaporator 12 carries with it the non-condensable gases collecting in the condenser 11 and the generator 10.

The non-condensable gases in the low pressure side of the system, that is, in the evaporator 12 and absorber 14, are carried to the bottom center part of the absorber by the sweeping action of the refrigerant vapor entering the top of the absorber through the headers 30. In order to localize the non-condensable gases in a relatively small space, such gases are withdrawn from the bottom part of absorber 14 through a conduit 50 to the top of an auxiliary absorber 51. A small portion of the absorption liquid flowing toward the upper part of absorber 14 in conduit 32 is diverted into a conduit 52. A screen 53 removes any foreign matter in the diverted liquid tending to clog a flow restricting device 54, and the restricting device in turn limits the rate at which liquid is diverted into conduit 52 from the main stream of absorption liquid flowing in conduit 32. The absorption liquid flows over plates 56 to provide a relatively extensive liquid surface.

While the gases withdrawn from absorber 14 through conduit 50 into auxiliary absorber 51 are for the most part non-condensable, these gases are not sufficiently localized in the bottom of the main absorber 14 and tests have shown that refrigerant vapor accompanies the non-condensable gases withdrawn from the main absorber. For this reason the gases withdrawn from absorber 14 are brought into intimate contact with diverted absorption liquid in the auxiliary absorber 51. Refrigerant vapor accompanying the non-condensable gases withdrawn from main absorber 14 is absorbed into absorption liquid in auxiliary absorber 51. The heat liberated with absorption of refrigerant vapor in auxiliary absorber 51 is transferred to the cooling medium flowing through a coil 55 connected between the inlet 44 and outlet 45 of the cooling system of the main absorber. The absorption liquid and gases both flow downwardly in auxiliary absorber 51, that is, the gas and liquid are in concurrent flow, and the gases arrive at the bottom part of the auxiliary absorber substantially stripped of refrigerant vapor.

The liquid flowing by gravity to the bottom part of auxiliary absorber 51 enters the upper end of a conduit 57 until the conduit is closed with liquid and sealed from the gases in the bottom part of the auxiliary absorber. When the liquid level rises sufficiently in the upper curved or bent portion of conduit 57, the small quantity of liquid within the open end is siphoned past the bend into the downwardly depending straight portion thereof. When liquid is siphoned from the upper curved end of conduit 57, the liquid level falls in the bottom part of the auxiliary absorber 51 below the upper open end of conduit 57, so that non-condensable gases pass into the upper bend or curved part of the conduit. The liquid level in the bottom part of the absorber 51 again rises to close and seal the upper end of conduit 57, and, when the liquid level again rises sufficiently, a small quantity of liquid is once more siphoned into the downwardly depending straight potrion of conduit 57. In this way small quantities of non-condensable gases are withdrawn from the bottom part of auxiliary absorber 51 and trapped between successive slugs of liquid formed at the upper curved or bent portion of the conduit 57. The conduit 57, which may be referred to as a fall tube pump, is of such size that flow of liquid is not appreciably restricted, however, the internal diameter is such that gas and liquid cannot pass each other while flowing downwardly through the conduit.

In accordance with my invention, a contacting or saturating vessel, designated generally by reference character 58, is connected to the lower end of fall tube 57 to receive non-condensable gases and absorption liquid discharged from the fall tube. Vessel 58 is provided with a plurality of inverted trays or bubble traps 59. A conduit 60 leads from the upper portion of vessel 58 and joins conduit 37 when the latter enters the heat exchanger 38. A conduit 61 leads from the top of vessel 58 to a storage vessel or purge receiver 62. As shown, a vacuum pump 63 is connected to the storage vessel by a conduit 64, which conduit is provided with a valve 65 for maintaining the system at the low pressure.

In the operation of fall tube 57 without the saturating vessel 58, after the apparatus has been in use for a considerable period of time and non-condensable gases have been pumped down sufficiently for satisfactory operation of the condenser and absorber, there is so little non-condensable gas in a bubble trapped in the fall tube that the bubble shrinks to a very small volume in passing through the fall tube. As the bubble passes downward, the pressure thereon increases so that when the bottom of the fall tube is reached the bubble is so small, in comparison with the accompanying absorption liquid, that contact between the two is very poor and only a very small fraction of the accompanying liquid ever comes in contact with the gas and has an opportunity to become saturated. The result is that far less than the equilibrium amount of gas is dissolved. and the part that might dissolve but does not, escapes to the purge receiver and is permanently lost.

By providing a contacting vessel or the like at the bottom of the fall tube in which the bubbles of non-condensable gases are trapped as they are discharged from the fall tube and are contacted with the absorption liquid simultaneously discharged, the non-condensable gases, or at least a portion thereof, are dissolved in the liquid thereby preventing the escape of these gases unless the gases are arriving from the purge pump faster than they can be dissolved in the liquid passing underneath the trapped bubbles. The absorption liquid with the dissolved non-condensable gases is conveyed from vessel 58 through conduit 60 to conduit 37, through the heat exchanger 38, vessel 40 and conduit 41 into the bottom of the generator. Any excess non-condensable gases escape through conduit 61 to the storage vessel 62, from whence the gases are evacuated to the atmosphere at intervals. In the generator the non-condensable gases reduce superheating and promote quiet boiling of the solution.

The fact that the purge pump delivers non-condensable gases at a low level, under a hydrostatic head of some 50 mm. of mercury, is very important in the operation of this device. This pressure assures that the partial pressure of non-condensable gases in the trap bubbles is of the order of 50 mm. of mercury, which is a substantial pressure and corresponds to a substantial equilibrium solubility of the non-condensable gases in the liquid. The fact that the contact of non-condensable gases and absorption liquid is established at a comparatively low temperature, approximately that of inlet cooling water, is likewise important in maintaining a high value of equilibrium solubility.

In a unit which contains no source of new non-condensable gases, such as nitrogen, from air leaks, or hydrogen, from corrosion, after the system has been operating for a time, any excess of non-condensable gases will have escaped to the purge receiver and a steady state will be set up in which the rate of solution of the gases from the trapped bubbles in the contacting vessel will balance the rate at which the gases are supplied to the contacting vessel by the purge pump, and no more bubbles will escape to the storage vessel. The bubbles of non-condensable gases which are caught beneath the traps in the contacting vessel are those which are large enough to rise through the liquid. After being caught the individual bubbles may survive for a time, but eventually they break and form one large bubble beneath each of the traps, as shown in the drawing. When the traps are full of non-condensable gases, and more gases arrive from the purge pump, or that already trapped expands due to changes in pressure and temperature, the excess gases flow beneath the lip of the uppermost of the bubble traps, rise through the liquid, and escape to the storage vessel. Once filled, the bubble traps will always contain some non-condensable gases. If, however, the charge of non-condensable gases should be lost, as by tipping the unit in shipment, a few cc. of air or hydrogen may be supplied to the unit to replace the lost charge.

Although a single embodiment of the invention has been shown and described, it will be apparent that various modifications and changes may be made without departing from the spirit and scope of the invention as pointed out in the following claims.

What is claimed is:

1. An absorption refrigerating system having a generator and condenser operable at one pressure and an evaporator and absorber operable at a lower pressure, means interconnecting said elements to provide closed circuits for the circulation of a refrigerating medium and an absorption solution, said last named means including conduits for flow of absorption solution from the generator to the absorber and back to the generator, said conduits including means for withdrawing non-condensable gases from the absorber, a contact vessel into the lower portion of which said last named means delivers non-condensable gases and absorption solution, and a plurality of bubble traps in said contact vessel through which the absorption solution flows, the construction and arrangement being such that non-condensable gases are dissolved in the absorption solution, which solution is conveyed to the bottom of the generator wherein the non-condensable gases reduce superheating and promote quiet boiling of the solution in the generator.

2. An absorption refrigerating system having a generator and condenser operable at one pressure and an evaporator and absorber operable at a lower pressure, means interconnecting said elements to provide closed circuits for the circulation of a refrigerating medium and an absorption solution, said last named means including a first conduit for flow of absorption solution weak in refrigerant from the generator to the absorber, a second conduit for flow of absorption solution strong in refrigerant from the absorber to the generator and a third conduit connected to said first conduit for flow of absorption solution therefrom to the second conduit, said third conduit including a purge pump for withdrawing non-condensable gases from the absorber, a contact vessel into the lower portion of which the purge pump delivers non-condensable gases, and a plurality of bubble traps in said contact vessel through which absorption solution flows enroute to the second conduit, the construction and arrangement being such that non-condensable gases are dissolved in the absorption solution, which solution is conveyed to the bottom of the generator wherein the dissolved non-condensable gases reduce superheating and promote quiet boiling of the solution in the generator.

3. An absorption refrigerating system having a generator and condenser operable at one pressure and an evaporator and absorber operable at a lower pressure, means interconnecting said elements to provide closed circuits for the circulation of a refrigerating medium and an absorption solution, said last named means including a first conduit for flow of absorption solution weak in refrigerant from the generator to the absorber, a second conduit for flow of absorption solution strong in refrigerant from the absorber to the generator and a third conduit connected between the first and second conduits for flow of absorption solution therebetween, said third conduit including a fall tube pump for withdrawing non-condensable gases from the absorber, a contact vessel into the lower portion of which the fall tube delivers non-condensable gases and absorption solution, and a plurality of bubble traps in the contact vessel through which the absorption solution flows, the construction and arrangement being such that non-condensable gases are dissolved in the absorption solution which solution is conveyed to the bottom of the generator wherein the non-condensable gases reduce superheating and promote quiet boiling of the solution in the generator.

4. An absorption refrigerating apparatus including a generator, a condenser, an evaporator, an absorber and conduits interconnecting said elements for flow of a refrigerating medium and an absorption solution, means including an auxiliary absorber for withdrawing non-condensable gases from the condenser, evaporator and absorber, a collecting vessel, means for conveying non-condensable gases from the auxiliary absorber to the collecting vessel, means in the collecting vessel for accumulating a certain quantity of non-condensable gases, means for returning at least a part of the non-condensable gases from the collecting vessel to another part of the apparatus, and means for exhausting to the atmosphere any excess of non-condensable gases beyond that retained in the collecting vessel.

5. A heat operated refrigerating apparatus including a generator, a condenser, an evaporator and an absorber interconnected for circulation of a working medium, means including a pump for withdrawing non-condensable gases from the condenser, evaporator and absorber, a collecting vessel for accumulating a given amount of the non-condensable gases withdrawn by said pump, means in the collecting vessel for dissolving the accumulated non-condensable gases in the working medium, and means for exhausting to the atmosphere any excess of withdrawn non-condensable gases beyond the given amount retained in the collecting vessel.

6. In the art of refrigeration through the agency of a heat-operated refrigerating system of the type wherein non-condensable gases accumulate, that improvement which comprises withdrawing such gases from certain active parts of the system in which parts the presence of the gases adversely affects the efficiency of the system, contacting the withdrawn non-condensable gases with an absorption solution weak in refrigerant whereby the non-condensable gases are substantially stripped of refrigerant, conveying the stripped non-condensable gases between slugs of absorption solution to a place of collection, accumulating a given amount of such gases in the place of collection, withdrawing the remaining or excess of the stripped gases from said place of collection to an inactive part of the system from whence the excess gases are exhausted to the atmosphere, and returning the accumulated gases from the place of collection to an active part of the system.

7. That improvement in the art of refrigeration through the agency of a heat-operated refrigerating system which comprises withdrawing non-condensable gases from certain parts of the system, flowing the withdrawn non-condensable gases in the form of relatively small bubbles between slugs of working liquid to a place of collection, collecting the small bubbles of non-condensable gases into a relatively large bubble, flowing the working liquid in contact with the large bubble of non-condensable gases whereby at least a portion of the non-condensable gases is dissolved in the working liquid, flowing the working liquid and dissolved non-condensable gases to another part of the system, and applying heat to the working liquid and dissolved non-condensable gases in the other part of the system wherein the dissolved non-condensable gases reduce superheating and promote quiet boiling of the working liquid.

8. In an absorption type refrigerating system, a device operative to withdraw non-condensable gas from certain parts of the system, a submerged trap for receiving and storing a certain quantity of such gas, said device including means for returning the trapped gas to the system, and means for exhausting to the atmosphere any exhausted gas beyond that caught in the trap.

9. In an absorption type refrigerating system, a device operative to purge non-condensable gas from certain parts of the system, a trap located beneath a body of liquid in the system for receiving and storing a certain quantity of the purged gas, said device including means for returning the stored gas to the system, and means for exhausting to the atmosphere any purged gas beyond the certain quantity retained in the trap.

10. In an absorption type refrigerating system, a device operative to withdraw non-condensable gas from certain parts of the system, a trap for receiving and accumulating a certain quantity of such gas, means connected with said trap for discharging to the atmosphere any withdrawn gas beyond the certain quantity accumulated in the trap, said trap being connected in the system in a manner that a given quantity of non-condensable gas is retained and circulated through the system.

11. An absorption refrigerating system including a generator, a condenser, an evaporator, an absorber, conduits interconnecting said elements for flow of a refrigerating medium and an absorption solution, and a by-pass for flow of absorption solution from and to the generator, said by-pass including means for withdrawing non-condensable gas from the absorber, means for accumulating and storing a certain quantity of the withdrawn non-condensable gas, means for discharging to the atmosphere any withdrawn non-condensable gas beyond the certain quantity accumulated in the storing means, and means included in said by-pass for returning to the system accumulated non-condensable gas from the storing means.

12. A method of promoting quiet boiling of refrigerant-absorbent solution in an absorption type refrigerating system which comprises purging non-condensable gas from a certain part of the system, trapping a certain quantity of the purged gas below a body of solution in the system, returning at least a portion of the trapped gas to the system, and exhausting to the atmosphere any excess of purged gas beyond that trapped below the body of solution.

RALPH M. BUFFINGTON.

REFERENCES CITED

The following references are of record in the file of this patent:

UNITED STATES PATENTS

| Number | Name | Date |
|---|---|---|
| 2,353,859 | Thomas | July 18, 1944 |
| 2,384,860 | Thomas | Sept. 18, 1945 |

FOREIGN PATENTS

| Number | Country | Date |
|---|---|---|
| 22,963 | Great Britain | Oct. 17, 1906 |